United States Patent Office 3,585,172
Patented June 15, 1971

3,585,172
RESIN COMPOSITION FOR ELECTROCOATING PAINT AND METHOD OF PREPARING THE SAME
Chyuzou Nishiyama and Nobutoshi Yamada, Kusatsu-shi, Japan, assignors to Ishihara Sangyo Kaisha, Ltd., Osaka, Japan
No Drawing. Filed Oct. 14, 1969, Ser. No. 866,395
Claims priority, application Japan, Oct. 14, 1968, 43/74,191
Int. Cl. C08f 27/08
U.S. Cl. 260—78.5                            13 Claims

ABSTRACT OF THE DISCLOSURE

A resin composition useful for preparing electrocoating paints containing a film forming resin with free carboxyl groups and specific amide groups in the molecule thereof.

This resin composition is prepared by amidating a part of the free carboxyl groups of an acid polymer containing $\alpha,\beta$-olefinically unsaturated carboxylic acids as polymerized units by the reaction of said acid polymer and a hydroxyalkylamine.

BACKGROUND OF THE INVENTION

Field of the invention

The present invention relates to a resin composition useful for preparing an aqueous paint bath composition for electrocoating or electrodeposition coating.

Moreover, the present invention relates to a method of preparing the aforesaid resin composition containing a film forming resin in a high concentration convenient for providing electrocoating or electrodeposition coating paints.

Description of the prior art

The term electrocoating or electrodeposition coating (hereinafter called only "electrocoating" in the specification) means a coating method wherein an electroconductive article to be coated is immersed in a bath containing an aqueous paint as a first electrode, and a second electrode is provided so that the second electrode is brought into contact with the aqueous paint in the bath. An electric current is passed between both electrodes through the bath to thereby electrically deposit the paint onto the surface of said article. Thereafter, the article is withdrawn from the bath and the paint coated on the surface of said article is cured by heating or other suitable means.

The electrocoating paint used in the above-mentioned conventional coating method consists mainly of a water dispersible, film forming resin, pigment, and water. Among these ingredients the film forming resin particularly contributes to the facility of preparing the electrocoating paint, the adaptability of the paint to be electrocoated, and the properties of the coating. Hence, it is considered to be important, and has been investigated to improve the properties of the film forming resin to be employed in such an electrocoating paint.

As such water dispersible, film forming resins there have hitherto been employed the following polycarboxylic acid resins:

(a) An adduct of an unsaturated fatty acid or an unsaturated fatty acid ester and an $\alpha,\beta$-olefinically unsaturated dicarboxylic acid, such as a maleinized oil.

(b) An alkyd resin having a high acid value.

(c) An adduct of an unsaturated monobasic acid ester of a resinous polyol and an $\alpha,\beta$-olefinically unsaturated carboxylic acid or an ester of a resinous polyol and a polycarboxylic anhydride.

(d) A copolymer of an $\alpha,\beta$-olefinically unsaturated carboxylic acid and other copolymerizable monomers.

(e) A resin prepared by partially modifying the aforesaid resins (a), (b), (c), or (d).

(f) A mixture of two or more aforesaid resins (a), (b), (c), (d) and (e).

In the case of employing aforesaid resin (a), the coating formed by electrocoating is yellowed during baking, and hence it is impossible to obtain a clear white or light-colored coating. Aforesaid resin (b) also has the same fault as resin (a) when the resin has been modified with an unsaturated fatty acid or an unsaturated fatty acid ester, while resin (b) which has not been modified by an unsaturated fatty acid or an unsaturated fatty acid ester is generally lacking in any self-curing ability, and thus a cross-linking agent is required for curing the resin with heating. In the case of aforesaid resin (c), an epoxy resin is generally used as the resinous polyol, which makes the resin expensive. In the case of using resin (d), a white or light-colored coating may be obtained by electrocoating, but the physical properties of the coating are generally unsatisfactory.

It is disclosed in, e.g., British Pat. 826,652, that a resin containing hydroxyalkyl amide groups is obtained by the reaction of an interpolymer containing acrylamide and a monoaldehyde, but this resin is a non-water dispersible resin, and cannot be used for electrocoating paint.

A water-dispersible resin containing hydroxyalkyl amide groups and carboxyl groups in the molecule is disclosed in U.S. Pat. 3,007,887, but this resin is prepared only as a composition having a low concentration (less than about 50%). In order to use such a resin composition for electrocoating, in particular, as a highly concentrated replenishment paint for electrocoating mentioned below, the resin composition must be concentrated under reduced pressure.

By the term replenishment paint is meant a highly concentrated paint to be replenished successively to an electrocoating bath as electrocoating is being continuously carried out. That is, the replenishment paint is used to maintain the proportion of the ingredients in an elecrocoating bath composition in the desired range during electrocoating by adding it to the bath in an amount corresponding to the amount of the paint components carried away from the electrocoating bath by being electrodeposited. A resin composition for preparing such a replenishment paint is required to contain usually more than 65% by weight of the resin component.

SUMMARY OF THE INVENTION

The inventors have found that a resin composition prepared by amidating at least a part of the free carboxyl groups of a polycarboxylic acid polymer containing an $\alpha,\beta$-olefinically unsaturated carboxylic acid as a polymerized unit with a specific hydroxyalkyl amine has a self-curing property when heated and is an excellent water dispersible and film forming composition for providing a comparatively white or light-colored coating by the electrocoating method.

The product formed by the reaction of a polycarboxylic acid polymer containing an $\alpha,\beta$-olefinically unsaturated carboxylic acid as a polymerized unit and a hydroxyalkyl amine is considered to be resin containing hydroxyalkyl amide groups and carboxyl groups.

One object of the present invention is to provide a film-forming resin composition suitable for preparing a paint capable of forming an excellent coating by electrocoating.

Another object of the present invention is to provide an industrial method of producing the aforesaid film-forming resin composition in a high resin concentration suitable for preparing an electrocoating paint, in particular a replenishment paint as mentioned above.

Other objects of the present invention will become apparent from the following description.

DESCRIPTION OF THE PREFERRED EMBODIMENT

The resin composition for an electrocoating paint of the present invention has the following advantages; that is, (1) By using the resin composition of the present invention for electrocoating paint, a glossy, hard coating of excellent physical properties is provided by electrocoating.

(2) The resin component in the resin composition is heat curable, hence the coating formed by electrocoating using this resin composition can be cured in a short time by heating without a curing agent or a cross-linking agent, such as a melamine-formaldehyde condensate or a urea-formaldehyde condensate.

(3) The coating obtained using the resin composition of the present invention is not severely yellowed during baking.

Therefore, the resin composition of this invention is very suitable for preparing an electrocoating paint which is employed for a one-coat finish by electrocoating.

Moreover, by the process of the present invention, a resin composition having a high resin concentration can be readily prepared. The resin composition thus prepared is suitable not only for preparing an electrocoating bath composition but also for preparing a replenishment paint to be added to electrocoating bath.

The resin composition for electrocoating paint of the present invention is the reaction product of a polycarboxylic acid polymer containing at least one $\alpha,\beta$-olefinically unsaturated carboxylic acid and at least one copolymerizable olefinically unsaturated monomer as polymerized units and a hydroxyalkyl amine represented by the general formula $$NHR \cdot C_nH_{2n}OH$$

wherein R represents a hydrogen atom or lower alkyl group and $n$ is an integer of at least 2. Said resin composition contains, as a film-forming resin, a resin having in the molecule free carboxyl groups and hydroxyalkyl amide groups represented by the general formula

wherein R and $n$ have the same meaning as above.

The polycarboxylic acid polymer to be used for producing the aforesaid resin composition may be prepared by a solution polymerization method.

In solution polymerization, it is preferred to use a water-miscible organic solvent such as a monohydric alcohol, a glycol, a glycol ether, a glycol acetate, a glycol ether acetate, an alkyl acetoacetate, a dioxane, and a diacetone alcohol. However, other water-immiscible organic solvents may be used in a small proportion.

By employing the aforesaid organic solvent in a proportion less than 35% of the total polymerization reaction mixture, a resin composition having a higher than 65% resin content is obtained.

The $\alpha,\beta$-olefinically unsaturated carboxylic acid which is a polymerized unit of the aforesaid polycarboxylic acid polymer includes not only a monocarboxylic acid but also a polycarboxylic acid and its anhydride. The examples of these carboxylic acids are acrylic acid, methacrylic acid, cinnamic acid, crotonic acid, maleic acid, maleic anhydride, fumaric acid, itaconic acid, itaconic anhydride, citraconic acid, citraconic anhydride, and monoalkyl esters of these di-carboxylic acids.

The copolymerizable olefinically unsaturated monomers which are another polymerized unit of the aforesaid polycarboxylic acid polymer include alkyl esters and hydroxyalkyl esters of $\alpha,\beta$-olefinically unsaturated monocarboxylic acids, di-alkyl esters of $\alpha,\beta$-olefinically unsaturated di-carboxylic acids and polymerizable vinyl or vinylidene compounds each containing a polymerizable $CH_2=C<$ group, but do not include compounds having carboxyl groups,

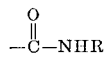

groups,

groups, or

groups wherein R and R' each represents a hydrogen atom or a lower alkyl group. As the monomers, there are illustrated methyl acrylate, ethyl acrylate, propyl acrylate, butyl acrylate, 2-ethylhexyl acrylate, lauryl acrylate, methyl methacrylate, ethyl methacrylate, propyl methacrylate, butyl methacrylate, 2-ethylhexyl methylacrylate, lauryl methacrylate, 2-hydroxyethyl acrylate, 2-hydroxypropyl acrylate, 2-hydroxyethyl methacrylate, 2-hydroxypropyl methacrylate, styrene, o-, m-, or p-methyl styrene, o-, m- or p-chloro styrene, $\alpha$-methyl styrene, $\alpha$-chloro styrene, vinyl acetate, vinyl naphthenate, acrylonitrile, methacrylonitrile, dialkyl maleate, dialkyl itaconate and the like. These monomers may be used alone, or combinations of them can be used.

It is desirable that the polycarboxylic acid polymer used in the present invention have an acid value of from 100 to 200, and hence it is preferable to control the ratio of the $\alpha,\beta$-olefinically unsaturated carboxylic acid and the copolymerizable olefinically unsaturated monomer so that the acid value of the polymerization product is within the aforesaid value. If the acid value of the polycarboxylic acid polymer is too low, the proportion of the free carboxyl groups contained in the reaction product of said polycarboxylic acid resin with said hydroxyalkyl amine is too little to disperse said reaction product in water. If this value is too high, a large proportion of free carboxyl groups will remain in said reaction product after amidation, which has an undesirable influence on the properties of coating. The polymerization temperature and period of time depend upon the nature of the monomers and the polymerization initiators employed along with the properties of the product copolymer desired. Generally, the conditions usually employed for conducting such a polymerization may be employed.

The polymerization reaction mentioned above is carried out in the presence of a free radical polymerization initiator and, if necessary, a chain transfer agent may be added to the reaction system.

Preferred examples of the free radical polymerization initiators used in the polymerization reaction are acetyl benzoyl peroxide, hydroxyheptyl peroxide, methyl ethyl ketone peroxide, cyclohexanone peroxide, cyclohexyl hydroperoxide, 2,4-dichlorobenzoyl peroxide, cumene hydroperoxide, tert-butyl hydroperoxide, methyl amyl ketone peroxide, acetyl peroxide, lauryl peroxide, benzoyl peroxide, methyl cyclohexyl hydroperoxide, p-chlorobenzoyl peroxide, di-tert-butyl peroxide, peractic acid, tert-butyl permaleic acid, di-tert-butyl diperphthalate, tert-butyl perphthalic acid, tert-butyl peracetate, isopropyl percarbonate, azobis-isobutyronitrile, dicumyl peroxide, and the like.

Preferred examples of the chain transfer agent, are such mercaptanes as dodecyl mercaptane, tert-dodecyl mercaptane, octyl mercaptane, hexyl mercaptane, and the like.

The resin composition of the present invention is prepared by reacting the aforesaid polycarboxylic acid polymer and the hydroxyalkyl amine (as will be described below) in such proportions that the chemical equivalent ratio of said hydroxyalkyl amine to the free carboxyl groups of said polycarboxylic acid polymer is less than 1.0, whereby at least a part of the free carboxyl groups of said polycarboxylic acid polymer is amidated.

As mentioned above, the hydroxyalkyl amine used for preparing the resin composition of the present invention is represented by the general formula $$NHR \cdot C_nH_{2n}OH$$

wherein R represents a hydrogen atom or a lower alkyl group having 1–12 carbon atoms and $n$ is an integer of at least 2, preferably 2–6. Examples of the hydroxyalkyl amines are 2-hydroxyethyl amine, 2-hydroxypropyl amine, 3-hydroxypropyl amine, 1-methyl-2-hydroxyethyl amine, 2-hydroxybutyl amine, 1-ethyl-2-hydroxyethyl amine, 1,1'-dimethyl-2-hydroxyethyl amine, 2-hydroxyhexyl amine, 2-hydroxyoctyl amine, N-methtyl-2-hydroxyethyl amine, N-ethyl-2-hydroxyethyl amine, 2-tert-butyl-2-hydroxyethyl amine, and the like.

To prepare the resin composition of the present invention, the chemical equivalent ratio of the aforesaid hydroxyalkyl amine to the free carbonyl groups of the acid polymer is less than 1.0, and the ratio of the polycarboxylic acid polymer and the hydroxyalkyl amine is so adjusted that the acid value of the reaction product is at least 30, preferably 50–110. If the chemical equivalent ratio of the hydroxyalkyl amine to the free carbon groups is higher than 1.0, the acid value of the product becomes near 0 and the water-dispersibility thereof is reduced. This reaction product is undesirable in the present invention. Also, if the proportion of the hydroxyalkyl amine is too large or too small, a resin composition having the desired properties cannot be obtained. If the proportion of the hydroxyalkyl amine is too small, the extent of amidation is low, which makes the heat-curing property insufficient. This will harm the physical properties and chemical retention of the coating obtained by electrocoating. On the other hand, if the proportion of the amine is too large, the proportion of the free carboxyl groups is reduced, which makes the water-dispersibility of the reaction product insufficient when the product is neutralized with ammonia or an amino compound (as will be explained later).

The reaction temperature for reacting the aforesaid polycarboxylic acid polymer and the hydroxyalkyl amine depends on the natures of the polycarboxylic acid polymer and the hydroxyalkyl amine to be employed, but is at least about 100° C., preferably about 120 to about 160° C. In this case, if the reaction temperature is too low, amidation is insufficiently conducted, while if the reaction temperature is too high, gelation occurs although amidation proceeds sufficiently. It is presumed that gelation results from the reaction between the hydroxyalkyl amide groups with each other or between the hydroxyalkyl amide groups and the free carboxyl groups, although such a presumption is not definite.

When the aforesaid polycarboxylic acid polymer is a copolymer having a polycarboxylic acid anhydride such as maleic anhydride as the polymerized unit, it is necessary that the anhydride ring be opened with water or a monohydric alcohol and thereafter the hydroxyalkyl amine be added. If the ring opening is not preliminarily conducted, the product may be gelled by the simultaneous occurrence of amidation and the esterification between the hydroxyalkyl amine and the anhydride.

The hydroxyalkyl amine used in the present invention is desirably amidated completely by the aforesaid reaction, but even if a small amount of the unreacted hydroxyalkyl amine remains in the reaction product, the unreacted hydroxyalkyl amine thus remaining contributes to neutralize the free carboxyl groups in the reaction product and accordingly, the amount of ammonia or an amino compound used for preparing the electrocoating paint, as will be described below, may be reduced.

The preparation of the electrocoating paint using the resin composition of the present invention requires no solvent removing step. For preparing the electrocoating paint using the resin composition of the present invention, at least a part of the free carboxyl groups of the resin, which is the main component of the resin composition, are neutralized with ammonia or an amino compound such as monomethyl amine, monoethyl amine, dimethyl amine, triethyl amine, ethylene diamine, diethylene triamine, triethylene tetramine, tetraethylene pentamine, morpholine, 2-hydroxyethyl amine, (di(2-hydroxypropyl)amine, tri(2-hydroxypropyl)amine, hydroxybutyl amine and the like.

The neutralized product is diluted with water to provide an aqueous dispersion. The extent of neutralization is desirably controlled in accordance with the acid value of said composition, the desired electrocoating conditions, and the content of the free basic materials in the electrocoating bath. However, in the case of providing the replenishing paint, the neutralization extent is preferably low as compared with the case of providing a paint composition for electrocoating bath.

Furthermore, in the preparation of the electrocoating paint using the resin composition of the present invention, suitable additives such as a pigment, and extender and/or auxiliary agents may be used in the conventional manner.

The resin composition for electrocoating paint of the present invention provides a coating having excellent gloss and physical strength by electrocoating, but may be blended, if necessary, with an alkyd resin, a phenolic resin, an aminoplast (such as hexamethoxymethyl melamine) or an epoxy ester resin, in order to reduce the heat-curing temperature or further to improve the physical and chemical properties of coating. Also, if desired, by adding a standard curing promoter such as p-toluene sulfonic acid, heat-curing can be promoted.

The invention will now be explained with reference to the following examples. In the aforesaid description and following examples, percent and parts mean percent by weight and parts by weight, respectively, unless otherwise defined. Also, the acid value shown in the examples is the value defined as the number of milligrams of potassium hydroxide required for neutralizing the acidity of 1 g. of non-volatile matter in the material.

EXAMPLE 1

In a reaction vessel equipped with a stirrer, a refluxing condenser, a thermometer, and a funnel for adding raw materials, 33 parts of ethylene glycol monobutyl ether was heated to 160–165° C. and while maintaining the temperature, a mixture of 32 parts of methacrylic acid, 48 parts of 2-ethylhexyl acrylate, 20 parts of styrene, and 2 parts of dicumyl peroxide was added at a gradual uniform rate to the ethylene glycol monobutyl ether over a two hour period. Thereafter, the system was further held at the aforesaid temperature for an additional two hours to complete the copolymerization. The acid value of the copolymer composition thus obtained was 185 and the resin content was 73.1%. Then, after cooling the copolymer composition to the temperature of 150° C., 18 parts of 2-hydroxypropyl amine was added thereto, and the resulting mixture was heated to 150° C. for three hours to conduct the amidation reaction. The acid value of the resin composition for electrocoating paint thus obtained was 67.9 and the resin content was 76.1%.

By employing the resin composition thus prepared, the following two electrocoatings were carried out.

(1) To 100 parts of the resin composition prepared above were added 3 parts of di(2-hydroxypropyl)amine and a suitable amount of deionized water to provide a clear aqueous paint having a solid content (resin content) of 6.6% and a pH of 9.08.

A zinc-phosphatized steel plate of 15 cm. in length, 5 cm. in width, and 0.05 cm. in thickness (as an anode) to be coated was immersed in a bath containing the aqueous paint prepared above in a stainless steel tank employed as a cathode. A direct current of 90 volts was passed between the electrodes and through the bath for 3 minutes to form a coating of the paint on the surface of the anode plate. In this case, the coulomb efficiency was 13.6 mg./coulomb. The coated plate was withdrawn from the bath, washed with water, and baked. The coating thus formed was hard and glossy and had good color, flexibility, and impact resistance. The properties of the coating are shown in Table 1. The aforesaid electrocoating operation was repeated in a continuous manner and when the solid content (resin content) in the bath lowered to 4.9%, a replenishment paint having a solid content (resin content) of 60%, prepared by mixing 100 parts of the resin composition of 76.1% resin prepared above and 26.8 parts of deionized water, was added to the coating bath to recover the original solid content of the bath. Thereafter, repeating continuously the same coating and replenishment operations as the above, the bath was maintained at a constant solids content range, and well colored, glossy, hard coatings with good physical properties were obtained.

(2) A mixture of 45.2 parts of the resin composition prepared above, 185.4 parts of rutile titanium dioxide pigment, 1 part of a nonionic surface active agent, and 121 parts of deionized water were charged into an Attritor (a mill made by Mitsui Miike Seisakusho) and they were ground for about 90 minutes to provide a concentrated pigment dispersion. To 100 parts of the pigment dispersion thus prepared were added 199 parts of the resin composition mentioned above, 6 parts of di(2-hydroxypropyl) amine, and 1464 parts of deionized water to provide a white aqueous paint having a solid content (resin content and pigment content) of 11.6%, a resin content/pigment content ratio of about 3, and a pH of 9.05. Using this white paint, electrocoating was conducted as in the case of using the aforesaid clear aqueous unpigmented paint. The gloss and strength of the coating were also excellent, as shown in Table 1. The coating was white and had a beautiful appearance.

Further, 100 parts of the aforesaid white concentrated pigment dispersion was mixed with 199 parts of the resin composition prepared above and 58 parts of deionized water to provide an aqueous concentrated paint having a solid content (resin content and pigment content) of 60%, so(ir75xh)
and a resin content/pigment content ratio of about 3. By using the aqueous concentrated paint thus prepared as a replenishment paint, the electrocoating procedure as in the case of using the aforesaid unpigmented paint was continued while supplying the replenishment paint to the bath. The results showed that the aforesaid aqueous concentrated paint was excellent as a replenishment paint for maintaining a constant solid content (resin content and pigment content) in the bath, and it gave a coating having excellent gloss, physical strength, heat-curing property, and no yellowing when baked.

On the other hand, the same procedure as above was followed with the exception that (a) 28.1 parts of trishydroxymethylamino methane, (b) 24.4 parts of di(2-hydroxyethyl)amine, or (c) 18.2 parts of di(2-hydroxyethyl)amine was used instead of 18 parts of 2-hydroxypropylamine at the amidation of the aforesaid copolymer solution. In these cases, gelation occurred after the reaction period of about one hour in case (a), about 75 minutes in case (b) and about 150 minutes in case (c). They were all unsuitable as resin compositions for electrocoating paints.

TABLE 1

| | Gloss | Sward Rocker Hardness | Pencil hardness | Mandrel flexibility, mm. | Impact resistance,[1] cm. | Cross-cut tape adhesion | Whiteness | Baking, ° C. x 20 minutes |
|---|---|---|---|---|---|---|---|---|
| Example: | | | | | | | | |
| 1-(1) | 100 | 30 | H | 2 | 40 | 100/100 | | 200 |
| 1-(2) | 92 | 26 | HB | 8 | 20 | 100/100 | | 180 |
| | 89 | 32 | H | 3 | 40 | 100/100 | 88 | 200 |

[1] Dupont reverse ½", 500 grams.

Gloss: Specular gloss measured by Gloss meter at an angle of 60° following ASTM D523.

Cross-Cut Tape Adhesion: Making a series of eleven parallel cuts 1 mm. apart through the film in one direction and a second series at right angles to the first, forming 100 square parts. Applying adhesive tape to the cross-cut area and peeling the tape. Cross-Cut Tape Adhesion is given as the number of squares remain intact.

Whiteness: Measuring L, $a$ and $b$ by color difference meter, and calculating whiteness, W, according to the following equation.

$$W = 100 - \{(100-L)^2 + (a^2 + b^2)\}^{\frac{1}{2}}$$

EXAMPLE 2

In the reaction vessel of Example 1, 33.4 parts of ethylene glycol monobutyl ether was heated to 160–165° C., and while maintaining at this temperature, a mixture of 30 parts of methacrylic acid, 55 parts of 2-ethylhexyl acrylate, 15 parts of styrene, and 3 parts of dicumyl peroxide was gradually added thereto at a uniform rate over a two hour period, and, thereafter, the resulting mixture was held at the aforesaid temperature for an additional two hours to complete the copolymerization. The acid value of the copolymer composition thus obtained was 159.2 and the resin content was 80.7%. After cooling the copolymer composition to 150° C., 14.2 parts of 2-hydroxyethylamine was added thereto and the reaction mixture was heated to 150° C. for three hours to conduct the amidation reaction. The acid value of the resin composition for electrocoating paint thus obtained was 50.8 and the resin content was 79.8%.

As in the case of Example 1–(2), by using the resin composition prepared above, a white aqueous paint having a solid content (resin content and pigment content) of 11%, a resin content/pigment content ratio of 2.5, and a pH of 9.0 was prepared for an electrocoating bath, and a white aqueous concentrated paint having a solid content (resin content and pigment content) of 65%, a resin content/pigment content ratio of 2.5, and a pH of 9.0 was prepared as the replenishment paint. By employing these aqueous paints, the electrocoating procedure of Example 1–(2) was repeated on a continuous basis. The results were almost the same as those of Example 1–(2).

EXAMPLE 3

In the same reaction vessel as in Example 1, 33.4 parts of ethylene glycol monobutyl ether was heated to 160–165° C. and while maintaining the system at this temperature, a mixture of 20 parts of acrylic acid, 55 parts of butylacrylate, 25 parts of styrene, and 3 parts of dicumyl peroxide was added to a gradual uniform rate to the ethylene glycol monobutyl ether over a two hour period. Thereafter, the system was held at the above temperature to complete the copolymerization reaction. The acid value of the copolymer composition thus obtained was 114.2 and the resin content was 78.6%. Then, after cooling the copolymer composition to 150° C., 8.2 parts of 2-hydroxyethylamine was added to the copolymer composition, and the reaction mixture was heated to 150° C. for three hours to conduct the amidation reaction. The acid value of the resin composition for electrocoating paint thus obtained was 67.2 and the resin content was 79.2%.

Then, 9.4 parts of di(2-hydroxypropyl)amine and a suitable amount of deionized water were added to 100 parts of the resin composition prepared above to provide a clear aqueous paint having a solid content (resin content of 7.1% and a pH of 9.16. By using this aqueous paint, the same electrocoating procedure as in Example 1 was practiced. A colorless, transparent baked coating having excellent gloss, hardness, and physical properties as in Example 1–(1) was obtained. When 1 part of paratoluene sulfonic acid was added during the preparation of the aqueous paint, the curing temperature for the coating could be reduced by about 20° C.

EXAMPLE 4

In the same reaction vessel as in Example 1, 23 parts of ethylene glycol monobutyl ether was heated to 160–165° C. and at this temperature a mixture of 35 parts of maleic anhydride, 25 parts of butyl acrylate, 40 parts of styrene, 2 parts of dicumyl peroxide, and 42.2 parts of ethylene glycol monobutyl ether was added at a gradual uniform rate to the ethylene glycol monobutyl ether was added at a gradual uniform rate to the ethylene glycol monobutyl ether over a two hour period. Thereafter, the reaction mixture was held at the above temperature for two hours to complete the copolymerization reaction. The acid value of the copolymer composition thus obtained was 130.4 and the resin content was 84.4%. Then, after cooling the copolymer composition to 150° C., 12.4 parts of 2-hydroxyethylamine was added thereto and the resulting mixture was heated to 150° C. for three hours to conduct the amidation reaction. The acid value of the resin composition for electrocoating paint thus obtained was 39.3 and the resin content was 77%.

Then, 7.6 parts of di(2-hydroxypropyl)amine and a suitable amount of deionized water were added to 100 parts of the resin composition prepared above to provide a clear aqueous paint having a solid content (resin content) of 8% and a pH of 8.15. With this aqueous paint, the same electrocoating procedure as in Example 1 was followed. A colorless, transparent baked coating having excellent gloss, hardness and physical properties as in Example 1–(1) was obtained.

Finally, in the specification the term "acid value" has been used (see col. 6). An additional term to define the extent of neutralization is MEQ, or the milliequivalents obtained by titrating a composition corresponding to 100 g. of solid material with 1/10 N HCl. The MEQ of the composition is generally 50–200 and preferably 70–150 for an electrocoating paint composition per se, with 10–70, preferably 20–60, being the values for a replenishment paint. For instance, in Example 1 the pH of 9.08 corresponded to a MEQ of 100.3, and 9.05 to 74.6.

What is claimed is:

1. A resin composition for electrocoating paint containing a film-forming resin having in the molecule free carboxyl groups and hydroxyalkyl amide groups represented by the general formula

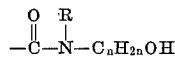

wherein R represents a hydrogen atom or a lower alkyl group and $n$ is an integer of at least 2, said resin being a reaction product of a polycarboxylic acid polymer containing at least one $\alpha,\beta$-olefinically unsaturated carboxylic acid and at least one copolymerizable olefinically unsaturated monomer as the polymerized units and a hydroxylalkyl amine represented by the general formula $$NHR \cdot C_nH_{2n}OH$$

wherein R and $n$ have the same meanings as above and the acid value of said composition being in the range of 10–200.

2. The resin composition for electrocoating paint as claimed in claim 1 wherein said composition contains more than about 65% by weight of said film-forming resin.

3. The resin composition for electrocoating paint as claimed in claim 1 wherein said film-forming resin contains free carboxyl groups in such proportion that the acid value of said resin is at least about 30.

4. The resin composition for electrocoating paint as claimed in claim 3 wherein said film-forming resin contains free carboxyl groups in such proportion that the acid value of said resin is about 5–110.

5. The resin composition for electrocoating paint as claimed in claim 1 wherein said polycarboxylic acid polymer contains at least one $\alpha,\beta$-olefinically unsaturated carboxylic acid as the polymerized units in such proportion that the acid value of said polymer is about 100–200.

6. The resin composition for electrocoating paint as claimed in claim 1 wherein said $\alpha,\beta$-olefinically unsaturated carboxylic acid is selected from the group acrylic acid, methacrylic acid, cinnamic acid, crotonic acid, maleic acid, maleic anhydride, fumaric acid, citraconic acid, citraconic anhydride, a monoalkyl ester of maleic acid, a monoalkyl ester of fumaric acid, a monoalkyl ester of itaconic acid, a monoalkyl ester of citraconic acid.

7. The resin composition for electrocoating paint as claimed in claim 1 wherein said copolymerizable olefinically unsaturated monomer is an alkyl ester or a hydroxyalkyl ester of an $\alpha,\beta$-olefinically unsaturated monocarboxylic acid, a dialkyl ester of an $\alpha,\beta$-olefinically unsaturated dicarboxylic acid or a polymerizable vinyl or vinylidene compound containing a $CH_2\!\!=\!\!C\!\!<$ group and containing no other functional groups.

8. A method of preparing a resin composition for electrocoating paint, which comprises reacting a polycarboxylic acid polymer containing at least one $\alpha,\beta$-olefinically unsaturated carboxylic acid and at least one polymerizable monomer as the polymerized units, and a hydroxylalkyl amine represented by the general formula $$NHR \cdot C_nH_{2n}OH$$

wherein R represents a hydrogen atom or a lower alkyl group and $n$ is an integer of at least 2, the chemical equivalent ratio of said hydroxyalkyl amine to the free carboxyl groups of said polycarboxylic acid polymer being less than 1.0, whereby at least a part of the free carboxyl groups of said acid polymer is amidated and the acid value of said composition is in the range of 10–200.

9. The method as claimed in claim 8 wherein said polycarboxylic acid polymer is provided by the solution-polymerization of at least one $\alpha,\beta$-olefinically unsaturated carboxylic acid and at least one copolymerizable olefinically unsaturated monomer in less than 35% by weight of a water-miscible organic solvent.

10. The method as claimed in claim 8 wherein the acid value of said polycarboxylic acid polymer is about 100–200 and said reaction is conducted by adding said hydroxyalkyl amine to said polycarboxylic acid polymer so that the acid value of the product becomes about 50–110.

11. The method as claimed in claim 8 wherein the reaction of said polycarboxylic acid polymer and said hydroxylalkyl amine is conducted at a temperature of about 100–160° C.

12. A method of preparing a resin composition for electrocoating paint which comprises treating a polycarboxylic acid polymer containing at least one $\alpha,\beta$-olefinically unsaturated carboxylic acid, at least a part of said acid being anhydridic, and at least one copolymerizable olefinically unsaturated monomer as polymerized units to open said anhydride rings, and reacting the ring-opened polycarboxylic acid polymer and a hydroxylalkyl amine represented by the general formula $$NHRC_nH_{2n}OH$$

wherein R represents a hydrogen atom or a lower alkyl group and $n$ is an integer of at least 2, the chemical equivalent ratio of said hydroxyalkyl amine to said free carboxyl groups being less than 1.0, whereby at least a part of the free carboxyl groups of said polycarboxylic acid polymer is amidated and the acid value of said composition being in the range of 10–200.

13. The method of claim 12 wherein all of said acid is anhydric.

References Cited
UNITED STATES PATENTS

| | | | |
|---|---|---|---|
| 3,428,589 | 2/1969 | Coats | 260—23.7 |
| 3,446,723 | 5/1969 | Pohlemann | 204—181 |

JAMES A. SEIDLECK, Primary Examiner
J. KIGHT III, Assistant Examiner

U.S. Cl. X.R.

260—80.73, 31.6, 32.8, 33.2, 33.4, 844, 851, 873, 86.1, 85.5, 88.1, 87.5; 204—181